Feb. 17, 1970    M. PLUTA    3,495,890
POLARIZING INTERFEROMETER MICROSCOPE
Filed Nov. 25, 1964
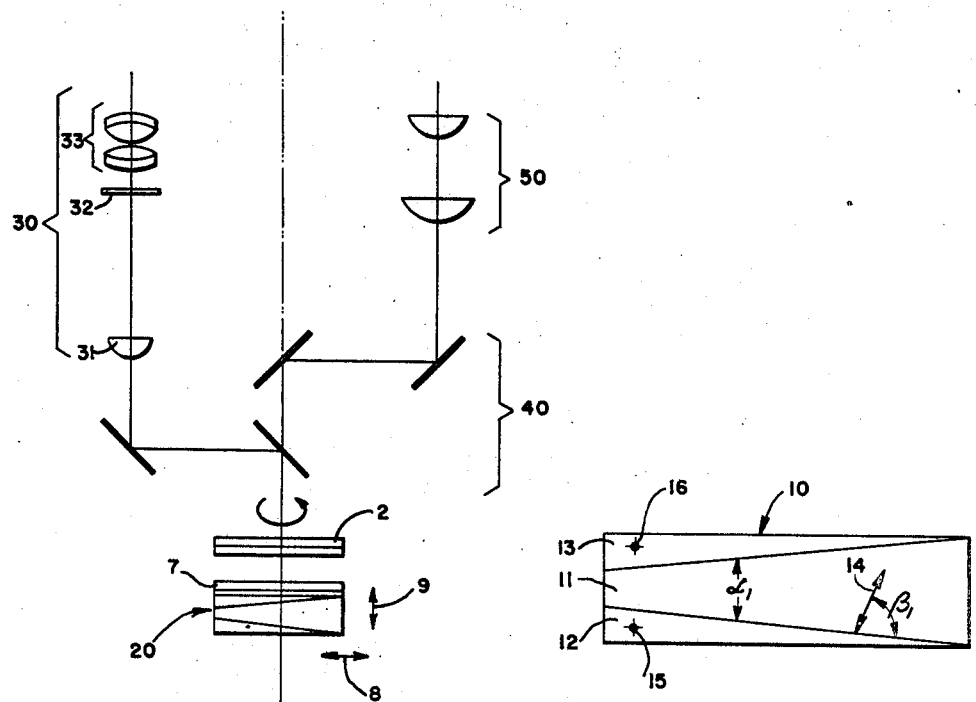
FIG. 1
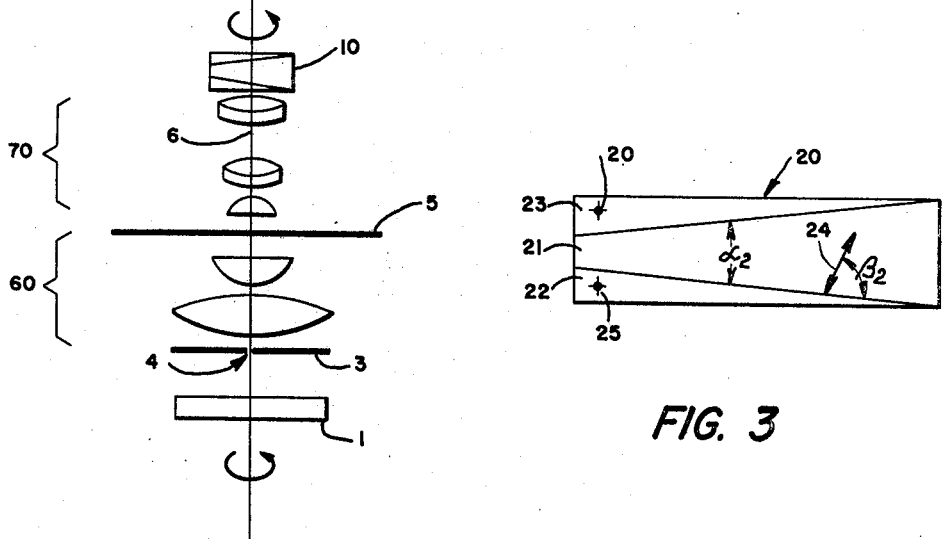
FIG. 2
FIG. 3
INVENTOR
MAKSYMILIAN PLUTA
BY *Larson and Taylor*
ATTORNEYS United States Patent Office 3,495,890
Patented Feb. 17, 1970

3,495,890
POLARIZING INTERFEROMETER MICROSCOPE
Maksymilian Pluta, 67 Sienna St.,
m. 31, Warsaw, Warszawa, Poland
Filed Nov. 25, 1964, Ser. No. 413,865
Claims priority, application Poland, Nov. 29, 1963,
103,090
Int. Cl. G02b 21/14
U.S. Cl. 350—13                                    3 Claims

ABSTRACT OF THE DISCLOSURE

An interference microscope for observation of microobjects in transmitted light and for measurement of their optical path difference both in homogeneous and fringe interference fields with variable image duplication. It consists of a condenser with a polarizer and slit diaphragm, an objective, a system of two birefringent prisms, an analyzer and a binocular attachment for observation of interference images and reading the optical path difference to be measured. One of the said birefringent prisms is located immediately above the microscope objective, and is rotatable about the objective axis to enable changing the image duplication. The second birefringent prism is located in the tube of the microscope and permits changing and measuring the optical path difference between two split light waves.

---

Hitherto known polarizing interferometer microscopes have been equipped with a type of Wollaston or Nomarsky birefringent prism with an outside interferometric line location plane, or with two equivalent Wollaston prisms correspondingly reciprocally oriented and having different properly selected prism apex angles. The impossibility to obtain a wide picture duplication in the homogeneous interferometer field are these microscopes drawback because of which their use especially in biological and medical research is limited to small cross dimension objects whose picture duplication may be at least 50 percent. Besides at the given microscope objective magnification the picture duplication is constant and its alteration involves the necessity of replacing the birefringent prism with one of a different apex angle.

All these drawbacks are eliminated in the microscope according to the invention. The polarizing interferometer microscope in accordance with this invention has a system of two birefringent prisms with outside plane of localization of interference fringes, a slit condenser diaphragm and an analyzer behind the system of birefringent prisms. One of these prisms is located in the tube of the microscope and is slidable in two directions; parallel to the objective axis and perpendicular to its own refracting edge, which latter is parallel to the slit of the aperture diaphragm of the condenser. The second birefringent prism is located immediately behind the objective and is rotatable about the objective axis. Rotation of this prism around the objective axis causes a change in the splitting value of the interference image of the objects under investigation. Generally, for a given refraction angle of the birefringent slidable prism and a given objective magnification there are three different values of image splitting. One value is obtained when the rotatable prism is oriented in conformity with the slidable prism (addition position of the rotatable prism), the second when the rotatable prism is oriented oppositely to the slidable prism (subtraction position of the rotatable prism) and the third when the edges of the rotatable prism form an angle of 45° with the edges of the slidable prism (neutral position of the rotatable prism). The present invention microscope enables the required picture duplication selection depending on the examined object size without any objective or prism exchange being necessary; maximum duplication values obtained in the homogeneous interferometer field are much higher than in case of a one birefringent prism microscope. Besides, the possibilities of applying this microscope are much broader, also for the measurement of large objects, e.g., large cells, wide fibres or histologic cuts.

The principles of the construction and operation of the polarizing interferometer microscope according to the invention are shown, in way of example, in the drawing, wherein FIGURE 1 is a schematic view of the elements of the microscope of the present invention; and FIGURES 2 and 3 are enlarged views of the two birefringent prisms of the microscope of the present invention.

Polarizing interferometer microscope according to the invention is composed, as is shown in FIGURE 1, of the following basic optical units: the birefringent prisms 10 and 20, the polarizer 1, the slit diaphragm 3, the condenser 60, the objective 70, the micrometric plate 7 provided to measure the birefringent prism 20 cross shift, the analyzer 2, the two-eyepiece cap 40, the ocular 50 provided for the observation of the examined object interferometer picture placed in the object plane 5, the auxiliary microscope 30 provided for reading the micrometric plate 7, the objective of this microscope 31—its focus plate with the indicator 32 and the ocular 33.

Birefringent prisms 10 and 20, as is seen in FIGURES 2 and 3, are composed of three quartz wedges 11, 12 and 13, and 21, 22 and 23 respectively, cut out in a known way in relation to the crystal optical axis marked on the drawing with a double-arrow 14 and 24 axis being on the drawing surface, or with a point mark 15 and 16, and 25 and 26 axis perpendicular to the drawing plane. The wedge 11 optical axis 14 is perpendicular to its refraction edge and inclined at an angle $\beta_1=35°-45°$ to one of the wedge face planes, whereas wedge 12 and 13 optical axis 15 and 16, respectively, is parallel to their refraction edges. Wedge 11 apex angle equals to the sum of wedges 2 and 3 apex angles values in the prism 10. The same relationships between the individual optical axes and between the apex angles likewise exist in birefringent prism 20. Instead of the most convenient three-part birefringent prisms, two-part prisms of the Nowarsky type composed of two wedges of equal apex angles, may be applied.

Forming a component part of objective 70, the birefringent prism 10 is rotatably mounted about the axis of objective 70 immediately behind the objective lenses and its fringe localization plane coincides with the image back focal point 6 of the objective 70. The birefringent prism 20 is mounted inside the microscope tube so that it may be shifted in parallel 9 and perpendicularly 8 in relation to the axis of objective 70. The parallel shift 9 permits the adjustment of the coincidence of its fringe localization plane with focal point 6 of exchanged objectives of different magnifications; the cross shift in the perpendicular direction 8 permits a phase change between the separated light beams and serves the purpose of measuring the optical path difference of the examined object.

When the prisms 10 and 20 apex angles $\alpha_1$ and $\alpha_2$ are in the same direction as illustrated in the drawing, the maximum duplication of the examined object is achieved, being the sum of each prism 10 and 20 duplication value. In an opposite case, when prisms 10 and 20 angles $\alpha_1$ and $\alpha_2$ are positioned in opposite directions, the duplication values are subtracted from each other. In an intermediate position, where prisms 10 and 20 refraction edges form an angle of 45°, total duplication equals the prism 20 duplication.

The maximum interference effect is achieved in the case when slit 4 of diaphragm 3 placed in the condenser focus is parallel to the prism 20 refraction edge, the light oscillation planes in polariser 1 and analyzer 2 form an angle of 45° with the same edge.

For typical microscope objectives, prisms 10 apex angle $\alpha_1$ may be up to 15°, whereas apex angle $\alpha_2$ of prism 20 placed inside an ordinary biologic microscope tube exceeds 4° because of permissible prism 20 thickness astigmatism. Thus a system of two prisms 10 and 20 enables the obtaining of the maximum picture duplication, approximately five times bigger in comparison with the hitherto known microscopes with one prism placed inside the tube.

The polarizing interferometer microscope according to the invention, equipped with a set of different magnification objectives, with rotational birefringent prisms 10 having apex angles of approx. 10° to 15° and thickness of about 5 mm., and with a system of exchangeable prisms 20 of several different apex angles $\alpha_2$ (e.g., 0°45′, 3° and 12°), permits the achieving of any duplication. It enables the application of different interferometric research methods, e.g., differentiation method in a homogeneous field ($\alpha_2=0°45′$) big picture duplication method ($\alpha_2=3°$ to 4°), and spectral lines method with big and differential picture quality ($\alpha_2$ differing very little from $\alpha_1$).

The polarizing interferometer microscope according to the invention may be applied especially to biological research and use in the textile industry and in crystallography.

What I claim is:

1. In an improved polarizing interferometer microscope comprising in series along an optical axis (a) a condenser assembly comprising a polarizer and a slit condenser diaphragm in optical series; and (b) microscope means comprising in optical series an objective, a birefringent optcal system, an analyzer, and occular means;

the improvement comprising two birefringent wedge prisms in said birefringent optical system, one said prism being movable parallel to said optical axis and perpendicularly to its own refracting edge, said refracting edge being parallel to the slit of said slit condenser diaphragm, the other said prism being adjacent said objective and rotatable about said optical axis.

2. An improved polarizing interferometer microscope as set forth in claim 1, wherein the planes of localization of interference fringes of said prisms coincide with the back focal point of the objective.

3. An improved polarizing interferometer microscope as set forth in claim 1, wherein said movable prism has an apex refraction angle of between approximately 10° and 15°.

References Cited

UNITED STATES PATENTS

| | | |
|---|---|---|
| 2,601,175 | 6/1952 | Smith. |
| 2,700,918 | 2/1955 | Osterberg et al. |
| 2,924,142 | 2/1960 | Nomarski. |
| 3,274,881 | 9/1966 | Sauer. |

DAVID SCHONBERG, Primary Examiner

PAUL R. MILLER, Assistant Examiner

U.S. Cl. X.R.

350—12, 14, 88, 157, 159